US000001087H

United States Statutory Invention Registration [19]

[11] Reg. Number: H1087

Sullivan

[43] Published: Aug. 4, 1992

[54] CASE TO INSULATION BONDING SYSTEM

[76] Inventor: Evester Sullivan, 618 Tewkesbury Pl. NW., Washington, D.C. 20012

[21] Appl. No.: 621,106

[22] Filed: Nov. 30, 1990

[51] Int. Cl.[5] ..... B32B 31/12; C06B 21/00

[52] U.S. Cl. ..... 156/153; 102/282; 264/3.1

[58] Field of Search ..... 156/153; 264/3.1; 102/282, 291, 287

[56] References Cited

U.S. PATENT DOCUMENTS

| | | | |
|---|---|---|---|
| 3,520,747 | 7/1970 | McGaughey | 156/153 |
| 4,108,940 | 8/1978 | Ratté et al. | 264/140 |
| 4,507,165 | 3/1985 | Herring | 264/3.1 |
| 4,953,476 | 9/1990 | Sayles | 264/3.1 |

*Primary Examiner*—Richard D. Lovering
*Assistant Examiner*—Joseph D. Anthony

[57] ABSTRACT

A metal case to non-metal bonding system that has a long shelf life and will withstand high temperature and pressure operating conditions and that satisfies requirements relating to material compatibility, surface preparation, strength, aging, ease of application and stability over a broad range of temperatures comprises a cylindrical metal case and a non-metallic insulation attached to the interior surface of the case wherein the case interior surface is sand blasted and cleaned, a corrosive resistant coating is applied and cured, a metal to rubber adhesive coating is brush applied and cured, uncured insulation material is laid up against the interior surface of the cured adhesive, several layers of insulation material are used wherein a vacuum bag is used between layers to attach adjacent layers, the uncured insulation, adhesive and metal liner are cured and vulcanized bonded, and the interior surface is machined to final dimensions to receive a solid propellant grain assembly.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CASE TO INSULATION BONDING SYSTEM

FIELD OF THE INVENTION

The present invention relates to solid propellant gas generators and more particularly, but without limitation thereto, to a chemical bonding system for bonding a rubber insulation to a metal case for use in a solid propellant gas generator.

BACKGROUND OF THE INVENTION

Modern guided missiles need high performance gas generators for providing high pressure and temperature gases to control nozzles of post-boost control systems and the like. This provides gas energy to achieve forward, reverse, pitch, yaw and roll thrust control of the missile equipment and re-entry body sections. Prior art techniques have not provided the high performance required for advanced weapon systems that must undergo severe operating environments and have longer term burn requirements for high pressure and temperature gases. Moreover, modern weapon systems often have long storage life requirements. It is critical that the integrity of the bonding system be maintained during both long storage life as well as during system operations. In bonding a metal motor case to its non-metallic composite insulation several problem areas exist including material compatibility, surface preparation, strength, aging, ease of application, and temperature stability over a broad range of temperatures. Solutions to these and other requirements have been accomplished by the case to insulation bonding system of the present invention.

OBJECTS OF THE INVENTION

An object of the present invention is to provide a metal case to non-metal bonding system that has a long shelf life and will with stand high temperature and pressure operating conditions.

Still another object of the present invention is to provide a cost effective, efficient and reliable metal case to non-metal insulation chemical bonding system.

A further object of the present invention is to provide a metal case to non-metal insulation bonding system that satisfies requirements relating to material compatibility, surface preparation, strength, aging, ease of application and stability over a broad range of temperatures. A still further object of the present invention is to provide an effective bonding system for bonding a metal to a non-metal insulation wherein the metal is titanium and the non-metal insulation comprises ethylene propylene, diene monomer (EPDM)/neoprene rubber binders containing silica powder filler and aramid fibers.

SUMMARY OF THE INVENTION

These and other objects have been demonstrated by the metal case to non-metal insulation bonding system of the present invention which comprises a cylindrical metal case and a non-metallic insulation attached to the interior surface of the case wherein the case interior surface is sand blasted and cleaned, a corrosive resistant coating is applied and cured, a metal to rubber adhesive coating is brush applied and cured, uncured insulation material is laid up against the interior surface of the cured adhesive, several layers of insulation material are used wherein a vacuum bag is used between layers to attach adjacent layers, the uncured insulation, adhesive and metal liner are cured and bonded, and the interior surface is machined to final dimensions to receive a solid propellant grain assembly. All of the above described characteristics have been achieved by the metal case to non-metal insulation bonding system of the present invention which will be described in detail with reference to the accompanying tables and drawings.

GLOSSARY

The following is a glossary of elements and structural members as referenced and employed in the present invention.

| | |
|---|---|
| 11 | gas generator |
| 13 | propellant grain |
| 15 | inhibitor |
| 17 | internal insulation |
| 19 | case |
| 21 | external insulation |
| 23 | internal insulation |
| 25 | foward closure |
| 27 | external insulation |
| 29 | gas outlet assembly |
| 31 | igniter assembly |
| 33 | aft dome section |
| 34 | thickened forward section of case 19 |
| 35, 37, 39, 41 | attachment lugs |
| 43 | thickened section of forward enclosure 25 |
| 45 | o-ring groove |
| 47 | annular retaining key groove |
| 49 | handling holes |
| 51 | retaining key |
| 53 | o-ring |
| 55, 57, 59, 61, 63 | silica phenolic insulation section |
| 65, 67, 69, 71 | molybdenum liners |
| 73 | internal outlet insulation |
| 75 | titanium elbow casting |
| 77 | columbium reducer |

DESCRIPTION OF THE PREFERRED EMBODIMENT

Figure 1:
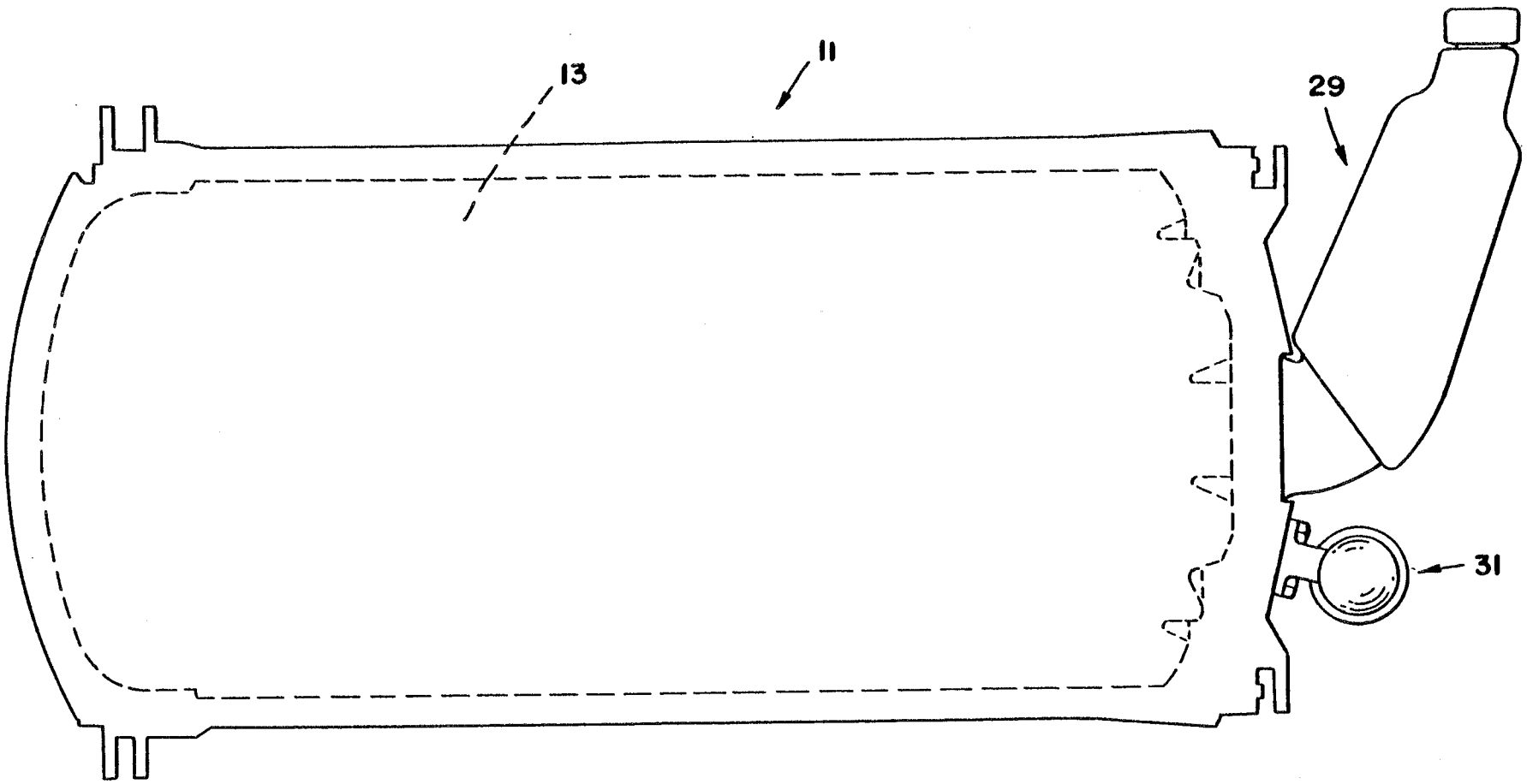
FIG. 1 is an overall side elevation sectional view of the gas generator which employs the metal case to non-metal insulation bonding system of the present invention.
Figure 1A:
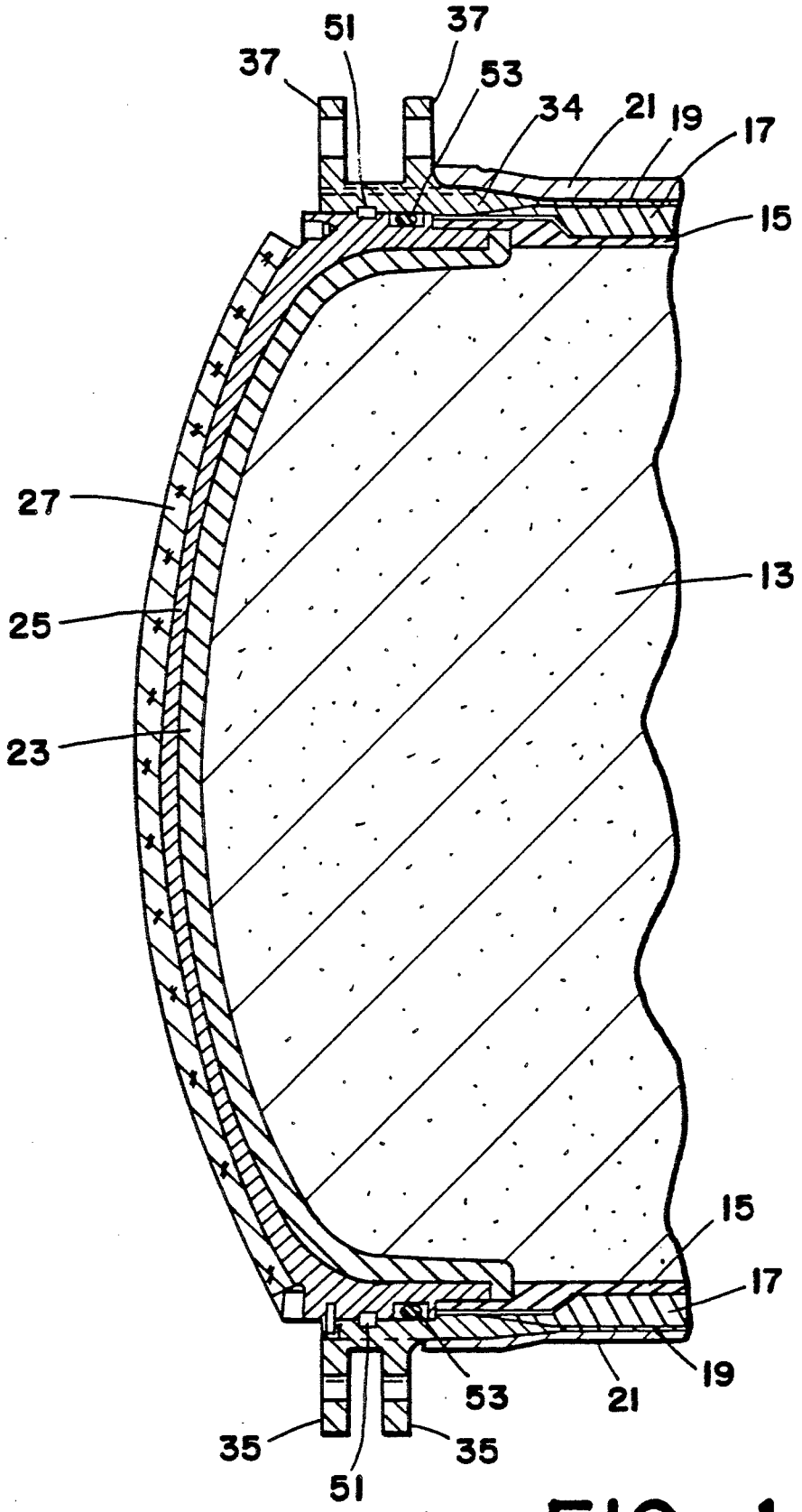
FIG. 1A is a sectional view taken of the forward section of FIG. 1.
Figure 1B:
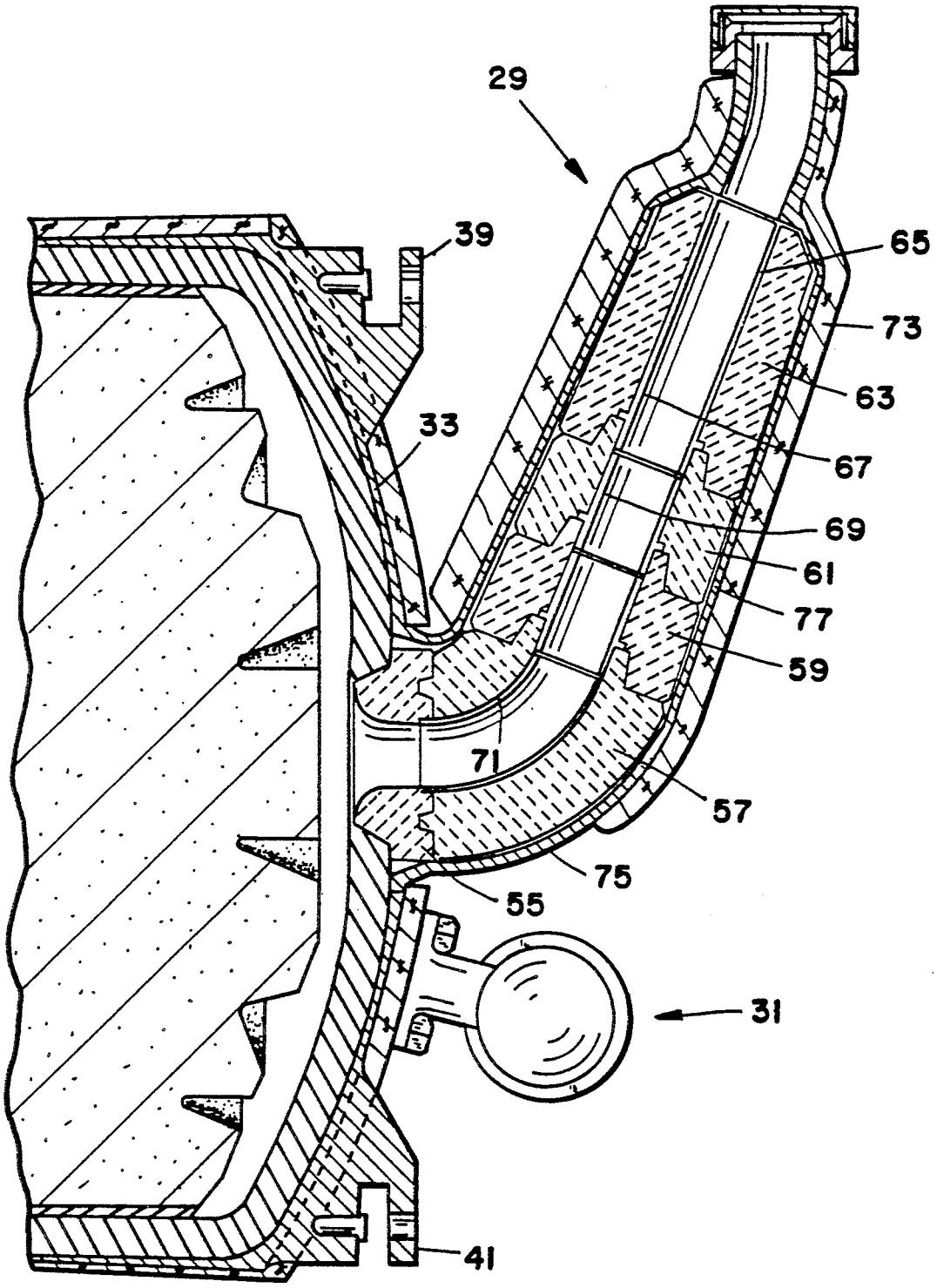
FIG. 1B is a sectional view taken at the aft section of FIG. 1.

Referring now to the drawings wherein like reference numerals are used to designate like or corresponding parts throughout the various figures thereof, there is shown in FIG. 1 a side elevation sectional view of the gas generator assembly of the present invention as indicated by reference numeral 11. FIGS. 1A and 1B show sectional views of the forward and aft ends of the generator of FIG. 1.

Gas generator 11 includes propellant grain 13, inhibitor 15, internal insulation 17, case 19, and external insulation 21. The forward section shown in FIG. 1A includes internal insulation 23, forward closure case 25 and external insulation 27. The aft section shown in FIG. 1B, includes gas outlet assembly 29 and igniter assembly 31. The propellant grain assembly 32 shown in FIG. 6 comprises cylindrical inhibitor 15, solid propellant grain 13 and forward closure 24, also shown in FIG. 1A. Forward closure assembly 24 includes forward closure 25, internal insulation 23 and external insulation 27 attached thereto.

Case 19 of FIG. 1B is of cylindrical configuration with an integral aft dome section 33, a thickened forward section 34 (see FIG. 1A) and attachment lugs 35, 37, 39, and 41. Forward closure 25 has a domed configuration, thickened section 43, O-ring groove 45, retaining key groove 47 and four handling holes 49. The forward closure is attached to the case with a retaining key 51 and is sealed by means of O-ring 53. Gas outlet assembly 29 includes insulation sections 55, 57, 59, 61, and 63, liners 65, 67, 69 and 71, external outlet insulation 73, elbow casting 75 and reducer 77.

The propellant grain is made from a hydroxy terminated polybutadiene polymer propellant with HMX solid particles used as an oxydizer (9HTPB/HMX) composite propellant with flame temperature of about 3,000° F. The propellant weight is approximately 250 pounds and is a cast-in-sleeve configuration having a length of about 29 inches and a diameter of about 13 inches. The grain is an end burning design with a configured start up surface for added initial burn area and uniform flame front propagation.

The radial surface between the exterior surface of the inhibitor 15 and the interior surface of the insulator 17 is an interference fit having no clearance. This is done to maximize propellant weight, assure mechanical integrity, and eliminate separation of the inhibitor and the propellant grain. The propellant grain assembly is loaded and unloaded by cooling the grain assembly to provide necessary clearance between the inhibitor and insulator and then subjected to normal temperature conditions where the interface has an interference fit.

Because of the severe temperature, time, pressure and load conditions put on a gas generator of the type described it is critical that the metal case to non-metal bonding system be effective under adverse conditions. The present invention provides such a bonding system the details of which are as follows:

(1) The titanium case (6AL-4V) is sandblasted with 180 grit aluminum oxide abrasive to a surface roughness not to exceed 125 (micro inches).

(2) The interior sandblasted surface is then cleaned by using a lint free cloth dampened in methyl ethyl ketone (MEK) solvent.

(3) A corrosion resistant coating such as Chemlok 205 TM (rubber to metal adhesive primer made by Lord Chemical Products) is then applied by brush application and having a nominal thickness of 1–2 mils. Chemlock 205 TM, for example, is a chlorinated resin and phenolic blend in 79% solvent with 5% titanium oxide and 1% zinc oxide.

(4) The corrosion resistant coating is then air dried at ambient temperature and atmosphere for at least 60 minutes.

(5) A metal to rubber adhesive coating such as Chemlok 252 TM is then applied by brush application and leaving a nominal thickness of 1–2 mils. Chemlock 252 TM, for example, is a chlorinated resin with EPDM rubber curing agent.

(6) The adhesive coating is then air dried at ambient temperature and atmosphere for at least 60 minutes.

(7) Uncured insulation material is then laid up against the interior surface of the air dried adhesive coating. Several layers are used until the desired insulation characteristics (defined by thickness or weight) are achieved. Each layer adheres to the next since the uncured material is tacky. Between each layer a vacuum bag is inserted and a vacuum is pulled between the bag and the insulation material to attach adjacent layers of material. The insulation material preferable has plastic backing for storage and handling purposes.

A specific example of the lay-up process for the sheets of uncured insulation is as follows:

1. For the metal aft dome insulation cut five patterns, four patterns of approximately 0.100 inch thick and 1 additional pattern (thickness as required of insulating material). Pattern sizes are nominal in inches as follows:

| Pattern | OD | ID | Thickness |
|---|---|---|---|
| 1 | 14.60 | 2.670 | .100 |
| 2 | 14.60 | 2.425 | .100 |
| 3 | 14.70 | 2.290 | .100 |
| 4 | 14.75 | 2.155 | .100 |
| 5 | 14.80 | 2.030 | As required |

2. For the metal case insulation cut five patterns of approximately 0.100 inch thick insulating material. Pattern sizes are nominal in inches as follows:

| | | Length | |
|---|---|---|---|
| Pattern | Width | Bottom | Top |
| 1 | 26 13/16 | 45¼ | 45½ |
| 2 | 26 | 45 | 44 11/16 |
| 4 | 25½ | 43¼ | 43¾ |
| 5 | 6½ | 42¼ | 42½ |

The grain direction of the insulation material shall run axially with the motor case.

3. Lay dome patterns on table and clean top side with MEK and allow to air dry 10 minutes minimum.

4. Place patterns 1 and 2 clean sides mating into a dome preform fixture. Leave plastic backing on the outsides.

5. Place patterns 3 and 4 in similar condition. Remove plastic backing from outside of pattern 4 and clean with MEK. Allow to air dry 10 minutes minimum. Place pattern 5, clean, unprotected side on pattern 4. Leave plastic backing on outsides of patterns 3 and 5. Place patterns into a dome preform fixture.

6. Place mold assembly into a press and pressurize to 5–8 tons for 5–8 minutes minimum. Allow insulating material to stay in mold until needed.

7. Remove dome insulation from fixture. Remove the plastic backing and clean with MEK. Allow to air dry 10 minutes minimum.

8. Place pattern into the case first, locating the edge the distance from case retaining key groove. Smooth the pattern against the inside of case. Wipe the pattern surface with MEK and allow to air dry 10 minutes minimum. Filtered circulating air is to be used for approximately 2 minutes.

9. Install conventional cure ring in case. Install an oven film bag and fasten to cure ring with vacuum sealer or equivalent. Attach vacuum lines to fittings on cure ring and elbow connector and pull vacuum (24 inch Hg) for 10 minutes minimum.

10. Remove cure ring, oven film bag and vacuum lines. Cure ring may be left in place.

11. Install two ply dome insulation piece into case. Align insulation hole with entrance to outlet.

12. Pull vacuum per Steps 9 and 10.

13. Install remaining dome insulation piece into case per steps 11 and 12.

14. Install remaining patterns individually per steps 9 and 10.

15. Using new O-rings, install case cure ring into end of case and install conventional retaining key cure plug. Place teflon glass fabric on dome and side wall full length. Install cure bag into gas generator case. Secure cure bag to cure ring with rubber strip and hose clamp. Remove gas generator case assembly from handling fixture and place on cart and secure. Install ortman key plug and apply vacuum sealer or equivalent to all sealing areas of case.

16. Pull vacuum of 24 inches Hg for 30 minutes minimum. Ensure that cure bag has all the wrinkles out, is seated correctly and there are no leaks. This step may be performed after installation into an autoclave but prior to the start of the heating of the autoclave.

17. Move case to the autoclave. Place gas generator case on cure cart and install in autoclave.

18. The insulation, adhesive and casing are now cured which results in a bonding between the case and insulation. A specific example of the autoclave curing process is as follows:

(a) Attach vacuum line from pump to vacuum fitting on case outlet.

(b) With assembly under a vacuum of 24 inches of mercury minimum, start heating autoclave to 160° F.±10° F. and maintain for 2.0–3.0 hours at temperature.

(c) Start air compressor and pressurize assembly to 125–145 psig and increase the temperature to 195° F.±10° F. Maintain temperature and pressure for 1.5–2.0 hours.

(d) Increase autoclave temperature to 325° F.±10° F. and maintain for 3.5–4.0 hours. NOTE: Any deviation from the required temperature tolerance of 10° F. or less for a total of 15 minutes or less will be acceptable as long as the actual cure time to the required temperature is within the required cure time tolerance except when the temperature deviates above the temperature requirement.

(e) Maintain 125–145 psig until autoclave temperature reaches 150° F. This cool down period shall not be less than 30 minutes.

(f) Release pressure, remove assembly from autoclave and allow to cool to ambient.

(g) Remove all fittings, cure bag, and glass fabric from gas generator case. Clean case as necessary using MEK.

19. After the completion of step 18 the interior surface is machined to final dimensions for receiving the propellant grain assembly.

This invention has been described in detail with particular reference to a certain preferred embodiment, but it will be understood that variations and modifications can be effected within the spirit and scope of the invention.

What is claimed is:

1. A method for bonding a non-metal insulation to an interior surface of a metal case, said method comprising the steps of:

(a) sand blasting the interior surface of said metal case;

(b) cleaning said sand blasted surface with a solvent;

(c) brush applying a corrosive resistant coating to said cleaned sand blasted surface;

(d) curing said corrosive resistance coating;

(e) brush applying an adhesive coating to said cured corrosive resistant coating;

(f) curing said adhesive coating;

(g) laying-up a first sheet of uncured insulation material against said adhesive coating;

(h) laying up a second sheet of uncured insulation material against said first sheet and attaching said second sheet to said first sheet by applying force thereto;

(i) repeat step (h) until desired insulation thickness is achieved; and (j) curing said insulation.

2. The bonding system of claim 1 wherein the sand blasted surface of step (a) has a surface roughness not to exceed 125 microinches, and said solvent is methyl ethyl ketone.

* * * * *